(12) United States Patent
Charters et al.

(10) Patent No.: US 10,289,844 B2
(45) Date of Patent: May 14, 2019

(54) PROTECTING BACKUP FILES FROM MALWARE

(71) Applicant: International Business Machines Corporation, Armonk, NY (US)

(72) Inventors: Graham C. Charters, Hampshire (GB); Bret W. Dixon, South Perth (AU); Benjamin T. Horwood, North Perth (AU); Alexander H. Poga, Peppermint Grove (AU); Mark A. Shewell, Perth (AU)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 15/409,692

(22) Filed: Jan. 19, 2017

(65) Prior Publication Data

US 2018/0203997 A1  Jul. 19, 2018

(51) Int. Cl.
*G06F 21/56* (2013.01)
(52) U.S. Cl.
CPC .......... *G06F 21/565* (2013.01); *G06F 21/568* (2013.01); *G06F 2221/034* (2013.01)
(58) Field of Classification Search
CPC ..................... G06F 21/565; G06F 2221/034
See application file for complete search history.

(56) References Cited

U.S. PATENT DOCUMENTS

| | | | |
|---|---|---|---|
| 8,667,273 B1 * | 3/2014 | Billstrom | G06F 21/6209 713/165 |
| 8,732,479 B1 * | 5/2014 | Henriksen | G06F 11/1464 709/201 |
| 8,930,423 B1 * | 1/2015 | Surampudi | H04L 63/0428 380/259 |
| 9,058,504 B1 | 6/2015 | Swanson et al. | |
| 9,118,685 B1 * | 8/2015 | Brocco | H04L 63/102 |
| 9,317,686 B1 | 4/2016 | Ye et al. | |
| 9,372,760 B1 * | 6/2016 | Tsaur | H04L 69/40 |
| 9,392,016 B2 * | 7/2016 | Sallam | G06F 21/52 |

(Continued)

FOREIGN PATENT DOCUMENTS

EP          3038003 A1    6/2016

OTHER PUBLICATIONS

Charters, et al., "Protecting Backup Files From Malware", U.S. Appl. No. 15/844,777, filed Dec. 18, 2017.

(Continued)

*Primary Examiner* — Joseph P Hirl
*Assistant Examiner* — Stephen T Gundry
(74) *Attorney, Agent, or Firm* — Daniel R. Simek

(57) ABSTRACT

A method for safeguarding a stored file from malware. In one embodiment, the method includes at least one computer processor receiving, to a storage system, a first file from a first computing device. The method further includes analyzing the received first file to determine whether the received first file is suspected of encryption by malware. The method further includes responding to determining that the received first file is suspected of encryption by malware, initiating one or more actions, including suspending replacement of an instance of the first file backed up to the storage system with the received first file. The method further includes storing the received first file to a portion of the storage system designated for file isolation.

14 Claims, 4 Drawing Sheets

(56) References Cited

U.S. PATENT DOCUMENTS

| | | | |
|---|---|---|---|
| 9,514,309 B1* | 12/2016 | Mann | G06F 21/60 |
| 9,665,711 B1* | 5/2017 | Jakobsson | G06F 21/554 |
| 9,720,849 B2* | 8/2017 | Amarendran | G06F 21/6218 |
| 9,727,491 B2* | 8/2017 | Amarendran | G06F 21/6218 |
| 9,734,348 B2* | 8/2017 | Erofeev | G06F 21/6218 |
| 9,762,386 B1* | 9/2017 | Nassaje | H04L 9/0819 |
| 9,779,253 B2* | 10/2017 | Mahaffey | H04L 63/0227 |
| 9,779,267 B2* | 10/2017 | Niemela | G06F 11/1458 |
| 9,785,775 B1* | 10/2017 | Turner | G06F 21/566 |
| 9,813,443 B1* | 11/2017 | Subramanian | H04L 63/145 |
| 9,842,203 B2* | 12/2017 | Fanton | G06F 21/10 |
| 9,846,776 B1* | 12/2017 | Paithane | G06F 17/30144 |
| 9,852,289 B1 | 12/2017 | Mann | |
| 9,888,032 B2* | 2/2018 | Dekel | H04L 63/145 |
| 9,917,859 B2* | 3/2018 | Harris | H04L 63/145 |
| 9,917,864 B2* | 3/2018 | Kraemer | G06F 21/552 |
| 9,922,192 B1* | 3/2018 | Kashyap | G06F 21/566 |
| 9,935,973 B2* | 4/2018 | Crofton | H04L 63/145 |
| 9,940,460 B1* | 4/2018 | Derbeko | G06F 21/568 |
| 2005/0138402 A1* | 6/2005 | Yoon | G06F 21/55 713/193 |
| 2006/0138402 A1 | 6/2006 | Cao et al. | |
| 2014/0181975 A1* | 6/2014 | Spernow | G06F 21/562 726/23 |
| 2014/0281514 A1* | 9/2014 | Erofeev | G06F 21/6218 713/165 |
| 2014/0359283 A1* | 12/2014 | Lee | H04L 67/2852 713/165 |
| 2015/0026460 A1* | 1/2015 | Walton | G06F 21/602 713/165 |
| 2015/0058987 A1 | 2/2015 | Thure et al. | |
| 2015/0172304 A1 | 6/2015 | Kleczynski | |
| 2015/0324301 A1* | 11/2015 | Iizuka | G06F 21/00 713/193 |
| 2016/0034702 A1* | 2/2016 | Sikka | G06F 21/6218 726/27 |
| 2016/0078245 A1* | 3/2016 | Amarendran | G06F 21/6218 713/193 |
| 2016/0196218 A1* | 7/2016 | Kumar | G06F 21/6218 713/193 |
| 2017/0076096 A1* | 3/2017 | Challener | G06F 21/53 |
| 2017/0083710 A1* | 3/2017 | Chapman, III | G06F 21/6218 |
| 2017/0093886 A1* | 3/2017 | Ovcharik | G06F 21/563 |
| 2017/0116433 A1* | 4/2017 | Erofeev | G06F 21/6218 |
| 2017/0140156 A1* | 5/2017 | Gu | G06F 21/602 |
| 2017/0171229 A1* | 6/2017 | Arzi | H04L 63/1416 |
| 2017/0177867 A1* | 6/2017 | Crofton | G06F 21/565 |
| 2017/0180394 A1* | 6/2017 | Crofton | H04L 63/145 |
| 2017/0185333 A1* | 6/2017 | Gauda | G06F 21/6218 |
| 2017/0187527 A1* | 6/2017 | Gauda | H04L 9/0897 |
| 2017/0206353 A1* | 7/2017 | Jai | G06F 21/565 |
| 2017/0223031 A1* | 8/2017 | Gu | G06F 3/0623 |
| 2017/0270293 A1 | 9/2017 | Gu et al. | |
| 2017/0302458 A1 | 10/2017 | Berger et al. | |
| 2017/0302635 A1 | 10/2017 | Humphries et al. | |
| 2017/0302653 A1 | 10/2017 | Ortner et al. | |
| 2017/0302696 A1 | 10/2017 | Schutz et al. | |
| 2017/0308700 A1* | 10/2017 | Friedrichs | G06F 21/56 |
| 2017/0310692 A1* | 10/2017 | Ackerman | H04L 63/1425 |
| 2017/0310693 A1* | 10/2017 | Howard | H04L 63/1425 |
| 2017/0310703 A1* | 10/2017 | Ackerman | H04L 63/1458 |
| 2017/0324755 A1 | 11/2017 | Dekel et al. | |
| 2017/0351854 A1 | 12/2017 | Knapp et al. | |
| 2017/0351858 A1 | 12/2017 | Knapp et al. | |
| 2017/0351870 A1 | 12/2017 | Knapp et al. | |
| 2017/0351877 A1 | 12/2017 | Knapp et al. | |
| 2017/0353460 A1 | 12/2017 | Knapp et al. | |
| 2017/0353461 A1 | 12/2017 | Knapp et al. | |
| 2017/0353484 A1 | 12/2017 | Knapp et al. | |
| 2017/0357814 A1* | 12/2017 | Mahaffey | H04L 63/0227 |
| 2017/0359306 A1* | 12/2017 | Thomas | H04L 63/10 |
| 2017/0359370 A1 | 12/2017 | Humphries et al. | |
| 2017/0364681 A1 | 12/2017 | Roguine et al. | |
| 2017/0372070 A1* | 12/2017 | Burdett | G06F 17/30203 |
| 2018/0004937 A1* | 1/2018 | Shannon | H04L 9/088 |
| 2018/0007069 A1 | 1/2018 | Hunt et al. | |
| 2018/0018458 A1* | 1/2018 | Schmugar | G06F 21/566 |
| 2018/0020013 A1 | 1/2018 | Yoshikawa et al. | |
| 2018/0024893 A1 | 1/2018 | Sella et al. | |
| 2018/0032446 A1 | 2/2018 | Amarendran | H04L 67/10 |
| 2018/0034835 A1* | 2/2018 | Iwanir | H04L 63/1416 |
| 2018/0039776 A1* | 2/2018 | Loman | G06F 21/54 |
| 2018/0048657 A1 | 2/2018 | Hittel et al. | |
| 2018/0048658 A1 | 2/2018 | Hittel et al. | |
| 2018/0075234 A1 | 3/2018 | Boutnaru | |
| 2018/0075239 A1 | 3/2018 | Boutnaru | |
| 2018/0075249 A1* | 3/2018 | Ray | G06F 21/6218 |
| 2018/0102902 A1 | 4/2018 | Yang et al. | |
| 2018/0107834 A1* | 4/2018 | Erofeev | G06F 21/6218 |
| 2018/0107838 A1* | 4/2018 | Amarendran | G06F 21/6245 |

OTHER PUBLICATIONS

Lee, et al., "CloudRPS: a cloud analysis based enhanced ransomware prevention system", The Journal of Supercomputing, pp. 1-20, Jul. 25, 2016.

"Ransomeware and Backup on the Cloud", Posted Nov. 12, 2013 by CloudTweaks, 12 pages.

List of IBM Patents or Patent Applications Treated as Related, Appendix P, Filed Herewith, 2 pages.

Charters, et al., "Protecting Backup Files From Malware", U.S. Appl. No. 15/889,298, filed Feb. 6, 2018.

\* cited by examiner

PROTECTING BACKUP FILES FROM MALWARE

BACKGROUND OF THE INVENTION

The present invention relates generally to the field of file storage, and more particularly to protecting files backed up to storage system from malware manipulation.

Computing devices ranging from mobile devices, such as smartphone; to personal computers; and to networked computing system are subjects of attacks by malicious software that can infect a computing device via a plurality of methods. Examples of types of malicious software include viruses, worms, and Trojans that install other malware programs. Malware programs can have minor to major impacts to a user and/or a computing device, such as adware that presents a user with unwanted advertisements and creates uncloseable windows; spyware that monitors actions of a user (e.g., key logging); and ransomware that encrypts files of a computing device and sends the computing device/user a message indicating the ransom request. Cybercriminals utilize ransomware to extort money from a user in exchange for: a password, decryption key, or other another program to decrypt the files of the computing device.

Anti-virus and anti-malware program may protect a computing device/user from known threats; however, new malware programs and/or modified malware programs can evade the protection offered by anti-virus and anti-malware programs leaving the files of a user vulnerable to ransomware. One recommended approach to protect the files of a computing device is for a user of the computing device to backup files of the computing device to a storage system. A storage system that directly connects to the computing device, such as a flash-drive or an external hard-drive may not be isolated from the actions of a malware program. Cloud-based storage solutions and/or enterprise storage solutions provide a secure storage location that is not affected by the operating system of an infected computing device. In addition, a storage solution (e.g., a server for file backup) stores files without executing files and thereby prevents other stored files from being affected (e.g., encrypted). Backup of files to a storage solution can occur: on a periodic basis, as dictated by a user, and/or in response to one or more programs of the computing device, such as a file management/backup program or a detecting an issue by an anti-malware program.

SUMMARY

According to aspects of the present invention, there is a method, computer program product, and/or system for protecting stored files from manipulation by malware. In an embodiment, the method includes one or more computer receiving, to a storage system, a first file from a first computing device. The method further includes analyzing the received first file to determine whether the received first file is suspected of encryption by malware. The method further includes responding to determining that the received first file is suspected of encryption by malware, initiating one or more actions, including suspending replacement of an instance of the first file backed up to the storage system with the received first file. The method further includes storing the received first file to a portion of the storage system designated for file isolation.

DETAILED DESCRIPTION

Figure 1:
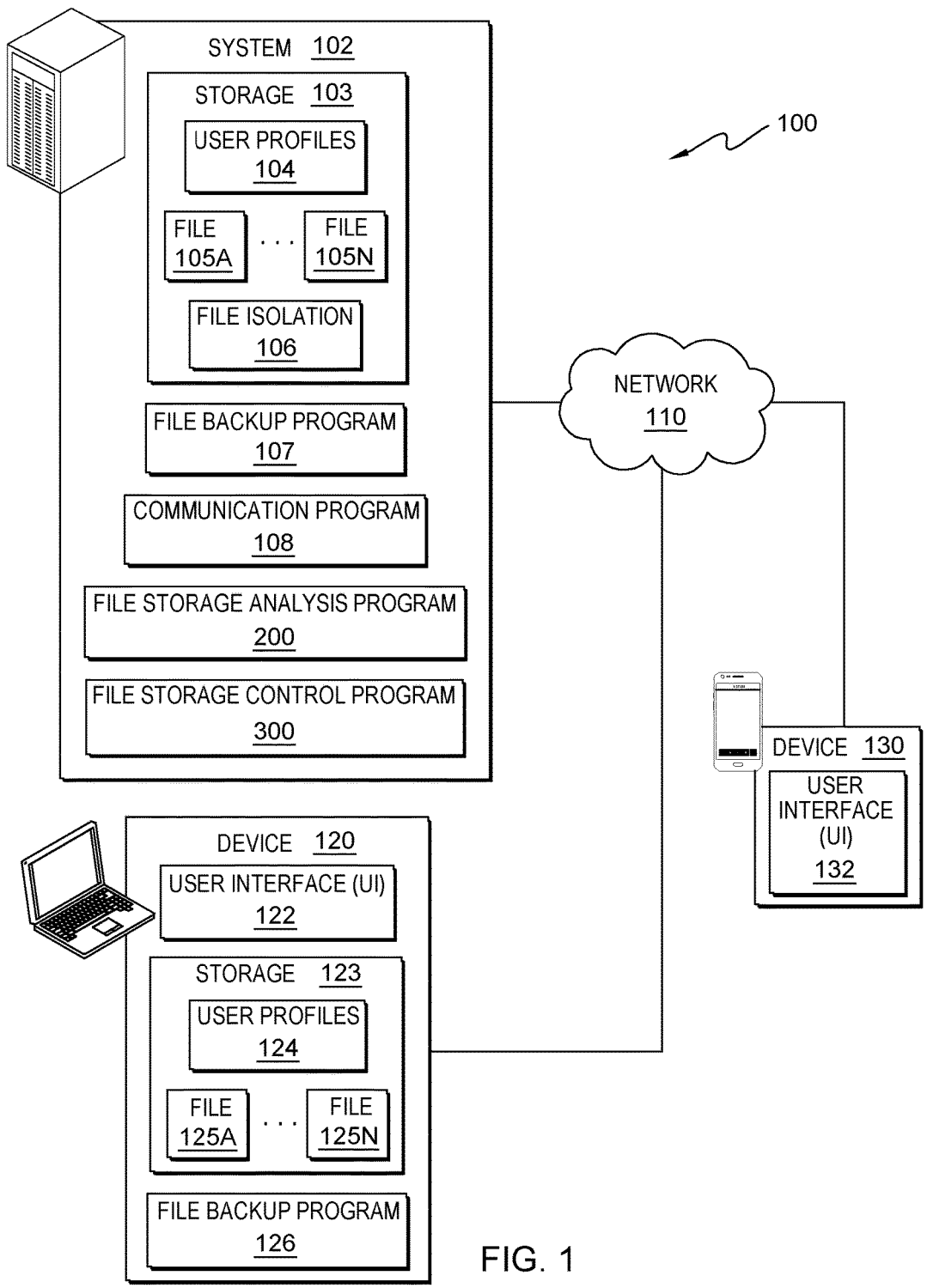
FIG. 1 illustrates a networked computing environment, in accordance with an embodiment of the present invention.

Embodiments of the present invention recognize that various technologies provide a user of a computing device methods to protect the files of the computing device from malware attacks, such as ransomware. Malware is a general term used to refer to a variety of forms of hostile or intrusive software, including computer viruses, worms, Trojan horses, ransomware, spyware, adware, scareware. It may be difficult for an anti-malware program to differentiate actions of a malware attack from actions of legitimate software applications of the computing device, especially if a user of the computing device utilizes file encryption and file compression technologies for various purposes. For instance, some actions utilized by a malware program operate similarly to actions of legitimate software applications. As such, various heuristics utilized by anti-virus and anti-malware programs can generate false-positive results.

Embodiments of the present invention recognize that various file backup systems (e.g., storage providers and backup service providers) include version control for stored files. Rather than completely replacing a stored file with a file uploaded for backup, a file backup service may provide a user of a computing device the ability to store various versions of a file on a backup storage system. Some file backup systems may constrain the number of versions of a file that are stored. For example, based on the service that a user subscribes to, a user may be limited to store five versions of a file for a basic file backup service account and fifteen versions of a file for a more advance file backup service account. As a new version of a file is received, another version of the file is rotated-out (e.g., is deleted, "expires," etc.). For example, in the basic-service account the first version of a file "expires" and is deleted upon receiving a sixth version of the file for backup. Other file backup systems may rotate-out versions of a file based on time, timestamps, and/or storage capacity. Storing multiple versions of a file within a backup storage system enables a user of a computing device to restore a previous version of a file. However, there is no guarantee that one or more files backed up to a storage system were already encrypted by ransomware prior to the ransomware encrypting a current version of a file and presenting a ransom message/threat.

Embodiments of the present invention also recognize that malware/ransomware can defeat various file backup schemes. In one example, ransomware could force multiple backups of a file in a short duration to force one or more unencrypted files within a storage system to expire. In another example, in response to a malware/ransomware program gaining access to the file backup software on a computing device, the ransomware may "bloat" files that are backed up to increase the file size and in response, the uploads force the storage account of a user to exceed the storage capacity of the account and trigger the expiration (e.g., deletion) of older versions of one or more files. In a further example, ransomware could co-opt the backup process, encrypting one or more files prior upload to a storage system, while temporarily maintaining an unencrypted version of the one or more file on a device of a user, before the final encryption of files of a device of a user and presenting the demands of the cybercriminals that created the ransomware.

Embodiments of the present invention protect (e.g., safeguard) file backups from a computing device to a storage system and/or storage service from various attack strategies of malware/ransomware. Embodiments of the present invention are applicable to cloud-based backup services and enterprise-based storage systems/services. Some embodiments of the present invention may be included within the firmware and/or flash memory of an external backup device associated with a computing device of a user. Embodiments of the present invention utilize various analytical techniques to identify whether a file received for backup is suspected being affected by a ransomware and/or malware attack. Suspect files are isolated to prevent initiating a file backup that could trigger one or more stored files to expire. In addition, embodiments of the present invention notify a user of the computing device that a file received for backup is suspect and that the computing device may be infected by malware. Various embodiments of the present invention can disable backup file rotation prior to receiving a response indicating whether the computing device is infected with malware/ransomware.

Some embodiments of the present invention utilize multi-device communications to determine whether a device is infected with malware and/or whether a storage system generates a false-positive result in response to analyzing a received (e.g., uploaded, backed-up) file. By utilizing multi-device communications, embodiments of the present invention prevent intelligent malware on the computing device from "spoofing" a response that indicates a false-positive indication for a suspected file that was received by the storage system. Spoofing refers to malicious actions of a malware program to masquerade as a user and provide false data, thereby circumventing one or more security measures and/or initiating actions different from the actions the user would initiate. Embodiments of the present invention can be utilized among users that share files and backup the files to the same storage system. By utilizing multi-device communications, embodiments of the present invention provide another layer of security by notifying the users that share an uploaded file, that at least one user may have one or more files and/or a computing device affected by malware.

Further embodiments of the present invention can interface with one or more other software applications of a computing device, of a storage system (e.g., backup service), or another computing system and/or cloud-based service accessible via a network. In one example, in response to determining that a computing device is infected with malware, a backup service can suspend file version rotation for all files associated with a storage account and force a backup of all files on the computing devices associated with the device to isolated storage. Such an action may prevent some of the files of the computing device from being encrypted by ransomware and enables the uploaded file to be analyzed. In another example, in response to determining that the computing device is suspected of a malware infection, an embodiment of the present invention can contact a network-accessible anti-malware program/service to scan the computing device. In another example, an embodiment of the present invention may utilize an anti-malware program/service to scan other files of a user not affected by ransomware to determine whether the backup files within the storage system may include dormant malware that could re-infect the computing device of a user in response to restoring backup files from the storage system to the computing device.

Further, embodiments of the present invention recognize that by including various analyses techniques in a storage system utilized for off-device file backups by users, as opposed to malware scans for known virus and malware signatures, improves detection of unwanted file modifications. Utilizing feedback from a user to determine whether analyses of a backed-up file generates a false positive result, especially for a file shared among user, provides another resource for one or more users to receive warning of suspicious activity with respect to one or more files. In addition, utilizing multi-factor verification techniques to respond to a false-positive report increases the security of the present invention against ever more sophisticated malware attacks. Also, by suspending file rotation within backup storage systems that support version control, the present invention improves the protection of the files of a user with respect to a ransomware attack. As such, the service and protections of a backup storage system is seen to be improved in at least these aspects. Similarly, reporting of shared files, suspected as targeted by a malware attack, to user that the suspected files ultimately improves the security of the devices of the users that share files.

The present invention will now be described in detail with reference to the Figures. FIG. 1 is a functional block diagram illustrating networked computing environment 100 in an embodiment, in accordance with the present invention. In an embodiment, networked computing environment 100 includes: system 102, device 120, and device 130, all interconnected over network 110. Many modifications to the depicted environment may be made by those skilled in the art without departing from the scope of the invention as recited by the claims.

System 102, device 120, and device 130 may be: laptop computers, tablet computers, netbook computers, personal computers (PC), desktop computers, personal digital assistants (PDA), smart phones, wearable devices (e.g., digital eyeglasses, smart glasses, smart watches, smart televisions, etc.), or any programmable computer systems known in the art. In certain embodiments, system 102, device 120, and device 130 represent computer systems utilizing clustered computers and components (e.g., database server computers, application server computers, etc.) that act as a single pool of seamless resources when accessed through network 110, as is common in data centers and with cloud-computing applications. In general, system 102, device 120, and device 130 are representative of any programmable electronic device or combination of programmable electronic devices capable of executing machine-readable program instructions and communicating with users of system 102, device 120, and device 130, via network 110. System 102, device 120, and device 130 may include components, as depicted and described in further detail with respect to FIG. 4, in accordance with embodiments of the present invention.

System 102 includes: storage 103, file backup program 107, communication program 108, file storage analysis program 200, and file storage control program 300. In some embodiments, system 102 accesses/subscribes to one or more computing programs and/or databases that are utilized by one or more embodiments of the present invention, and/or device 120 that are included within another computing system (not shown) that is network accessible. In an example, system 102 may have a license to access an anti-malware program and/or one or more analytics programs as-a-service via a cloud-service provider. System 102 transmits a copy of a suspect file to the other network accessible computing system for analysis, and in response system 102 receives a result of the analysis. Alternatively, system 102 may provide a cloud-based anti-malware program (not shown) network access to scan device 120 for malware.

Storage 103 includes user profiles 104, files 105A thru 105N, and file isolation 106. In an embodiment, storage 103 may also include various programs and/or databases, such as but not limited to: an operating system, a file management program, a database management system, an e-mail program, a suite of analysis/cryptographic programs, an anti-malware program, server-side enterprise software, etc. (not shown) utilized by system 102.

User profiles 104 includes a plurality of profiles of users that utilize system 102 as a computing system to backup (e.g., store) various files from one or more instances of device 120. Each user profile of user profiles 104 may include: storage account information, such as a service level agreement; a list of files stored by a user within system 102; a list of users that share access to one or more files; information associated with each user, such as contact preferences (e.g., e-mail, text message, etc.), authentication information, file version control setting, an identity corresponding to each instance of device 120; and contact information for instances of device 130, such as preferred communication method and a multi-factor identification scheme.

Account information of a user within user profiles 104 may further include file version control parameters, costing and payment information, account storage capacity, file backup schedules, etc. A list of files of a user may also include a list of file attributes for each file, such as size, encryption protocol, metadata, read-only flags, do not delete/never expire flags, one or more cryptanalysis values (e.g., MD5 values), etc. In addition, based on information associated with files identified within user profiles 104, file storage analysis program 200 may set timeout durations based on various criteria. In one example, in response to a timeout duration expiring for files identified as critical, file storage control program 300 responds to the timeout expiration as confirmation of a malware attack. In another example, in response to a timeout duration expiring, file storage control program 300 terminates. In another example, in response to a timeout duration expiring, file storage control program 300 prompts file storage analysis program 200 to transmit another notification to a user.

User profiles 104 may also include information related to device 120, such as an ID, media access control (MAC) address, an Internet protocol (IP) address, a list of security programs and function installed on device 120 (e.g., encryptions programs, an anti-malware program, file compression programs, etc.) and related application programming interfaces (APIs) for one or more installed programs and/or functions. In an embodiment, user profiles 104 include access and/or control information of an instance of device 120 corresponding to a user.

In one embodiment, file isolation 106 is a portion of storage 103 designated for the temporary storage of one or more files received for backup while analyses are performed on a file received for backup to determine whether the received file is suspected of encryption by malware. In another embodiment, file isolation 106 is a portion of storage 103 designated for the temporary storage of one or more files received determined to be suspected of encryption by malware. In some embodiments, file isolation 106 is also used to store one or more files backed up to system 102 that are identified as belonging to a set of files of a user or group of users that have a file suspected of and/or infected by malware. File isolation 106 may utilize volatile storage media, persistent storage media, or a combination thereof.

File backup program 107 is a server-side program that receives and stores files backed up from device 120. Based on information within user profiles 104, file backup program 107 determines the storage capacity of storage 103 that is associated with a storage account of a user of device 120. In one embodiment, file backup program 107 is integrated with file storage analysis program 200 and file storage control program 300. In another embodiment, file backup program 107 can execute independent of file storage analysis program 200 and file storage control program 300. For example, if a user profile within user profiles 104 indicates that a user subscribes to a ransomware protection service, then file backup program 107 interfaces with file storage analysis program 200 and file storage control program 300. In various embodiments, file backup program 107 includes file version control capabilities and utilizes the file version control parameters corresponding to a storage account of a user identified within user profiles 104.

In some embodiments, file backup program 107 isolates one or more files, either received from an instance of device 120 or stored within storage 103 of system 102, and suspends the rotation/expiration of one or more files in response to file storage analysis program 200 and/or file storage control program 300 determining that an instance of device is suspected of or subject to a malware attack. In addition, file backup program 107 may process one or more buffered, cached, or isolated files based, at least in part, on information obtained from file storage analysis program 200 and/or file storage control program 300, such removing a received file from file isolation 106 in response to determining that a false-positive result is confirmed.

In various embodiments, file backup program 107 buffers or caches a file received for backup while the file received for backup is analyzed. In some scenarios, file backup program 107 buffers or caches a file received for backup in a portion of volatile memory (not shown) within system 102 while the file received for backup is analyzed. In other scenarios, file backup program 107 buffers or caches a file received for backup in file isolation 106 while the file received for backup is analyzed. In other embodiments, file backup program 107 restores one or more files to device 120 after a malware attack is terminated.

Communication program 108 includes one or more programs or protocols that enable system 102 to communicate with device 120 and device 130. In one embodiment, communication program 108. In some embodiments, communication program 108 monitors the activity of network 110 and communicates a status of network 110 to file backup program 107. Based on the status of network 110, file backup program 107 can modify when a backup of one or more files occurs. In an example, communication program 108 determines that network traffic is heavy, in response if file backup program 107 determines that a large number of files are scheduled for a server-initiated backup, file backup program 107 may delay the server-initiated backup.

In another embodiment, communication program 108 interfaces with file storage analysis program 200 and/or file storage control program 300 to transmit notifications and information to one or more users that backup files to system 102, and receives one or more responses from one or more users that backup files to system 102. In some scenarios, communication program 108 communicates with a user via a UI associated with file backup program 126. In other scenarios, communication program 108 communicates with a user via a different UI of device 120 and/or device 130. In one example, communication program 108 utilizes a text messaging app to activate a corresponding text messaging version of UI 122 of device 120 and/or UI 132 of device 130. In another example, communication program 108 activates an Internet-based version of UI 132 within device 130 to enable a user to interface with file storage analysis program 200 and/or file storage control program 300.

File storage analysis program 200 is a program that analyzes files backed up from an instance of device 120 to system 102. In one embodiment, file storage analysis program 200 is integrated with file backup program 107 and file storage control program 300. In another embodiment, file storage analysis program 200 is a service that a user of file backup program 107 and system 102 subscribes to, which improves the protection of files of device 120 from ransomware.

In a further embodiment, in response to file storage analysis program 200 determining that a received file is suspect and/or file storage control program 300 receiving a confirmation that device 120 is affected by a malware attach, file storage analysis program 200 can analyze other files of a user within storage 103 to determine whether additional files are suspect. In addition, file storage analysis program 200 may utilize an anti-virus/anti-malware to determine whether other backup files of a user that are not encrypted, are infected with malware.

Figure 2:
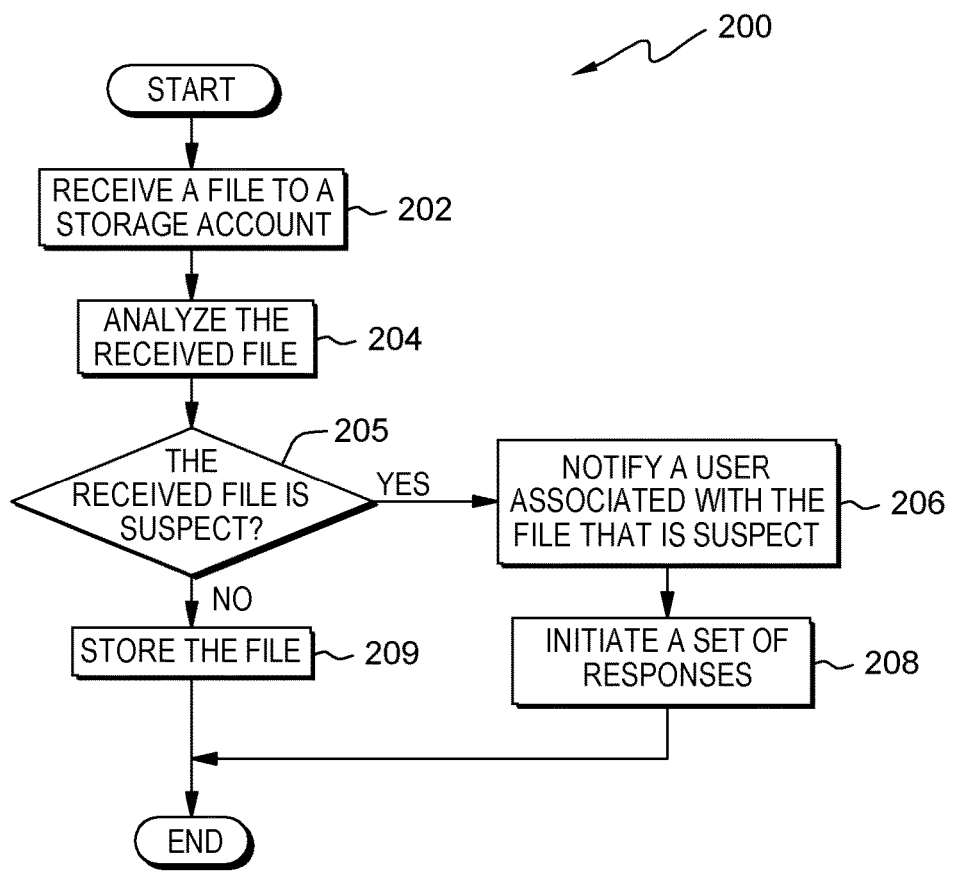
FIG. 2 depicts a flowchart of the operational steps of a file storage analysis program, in accordance with an embodiment of the present invention.

FIG. 2 is a flowchart depicting operational steps for file storage analysis program 200, a program that analyzes one or more files received (e.g., uploaded) to a storage account as part of a file backup strategy for a device of a user. In response to determining that the file is not suspect, file storage analysis program 200 stores the one or more received files. Alternatively, if file storage analysis program 200 determines that a file is suspect, such as encryption by ransomware or affected/infected by malware; then file storage analysis program 200 notifies a user to determine whether the result of the analysis is a "false positive" result or that one or more files of a user and/or a device of the user is affected by malware. In some embodiments, file storage analysis program 200 utilizes multi-factor verification of a malware event to reduce the possibility of the malware from reporting (e.g., spoofing) a false positive result, in an attempt to disable one or more security measures associated with the present invention. In various embodiments, file storage analysis program 200 initiates one or more responses in response to identifying a suspect file to protect other versions of the file backed up within a storage account. In an embodiment, one or more instances of file storage analysis program 200 may execute concurrently with one or more instances of file storage control program 300.

File storage control program 300 is a program that confirms whether analyses performed by file storage analysis program 200 to a file received for backup generates a false-positive result. File storage control program 300 may receive confirmation of a false-positive result for a received file from: a user that backed up the file, another user that shares the file, and/or an administrator for a portion of networked computing environment 100. In some embodiments, information within user profiles 104 dictates the method that file storage control program 300 utilizes to confirm a false-positive result.

In one embodiment, if a false-positive result of a file for backup is not confirmed, then file storage control program 300 initiates various responses based on treating device 120 as infected by malware. Alternatively, file storage control program 300 may include one or more timeout duration criterion associated with receiving a response. In some scenarios, in response to an expiration of a timeout duration, file storage control program 300 resumes the activities of a storage account of a user. In other scenarios, in response to an expiration of a timeout duration, file storage control program 300 treats the file received for backup and the computing device that uploaded the file as if affected by malware.

In another embodiment, if file storage control program 300 determines that the file received for backup is encrypted by ransomware and/or treats device 120 as affected by malware, then file storage control program 300 identifies other files associated with a user and/or shared among one or more other users. In addition, file storage control program 300 suspends the rotation of one or more files for backup for a user and computing device that uploaded the affected file. In some embodiments, in response to file storage control program 300 identifying one or more other users that share a malware affected file, and more specifically ransomware, file storage control program 300 suspends the rotation of one or more files of the other users that backup files to the storage system.

In a further embodiment, file storage control program 300 receives a response from one or more programs or systems as opposed to users, such as an anti-malware that scans one or more computing devices of one or more users. In some scenarios, file storage control program 300 scans files of users, backed up to a storage system for malware. In other scenarios, file storage control program 300 can dictate that an anti-malware program scans the files of a computing device. In various scenarios, file storage control program 300 can dictate that a file backup program retrieves various file from backup storage and/or a computing device and isolates the retrieved files within the storage system for further analyses.

In various embodiments, in response to the termination of a malware attack within a device of a user, file storage control program 300 restores one or more files associated with the user to the device of the user. Subsequently, file storage control program 300 resumes one or more activities associated with a storage account of the user.

In one embodiment, system 102 communicates through network 110 to device 120 and device 130. In some embodiments, system 102 communicates with one or more other computing systems and/or computing resources, such as a web server, an e-mail server, a cybersecurity service, etc. (not shown) via network 110. Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between system 102, device 120, and device 130, in accordance with embodiments of the present invention. In various embodiments, network 110 operates locally via wired, wireless, or optical connections and can be any combination of connections and protocols (e.g., personal area network (PAN), near field communication (NFC), laser, infrared, ultrasonic, etc.).

Device 120 may include user interface (UI) 122, storage 123, and file backup program 126. Storage 123 includes user profiles 124 and files 125A thru 125N. In addition storage 123 also stores various programs and data (not shown) utilized by device 120. Examples of programs that storage 123 may include are: an operating system, a web browser; an office productivity suite; a communication program, one or more applications (apps), such as an instant messaging (IM) app, an anti-malware program; an antivirus program; etc. Examples of data that storage 123 may include, but are not limited to are: user preferences, a web browsing history, music files, video files, etc.

In one embodiment, UI 122 may be a graphical user interface (GUI) or a web user interface (WUI), and UI 122 can display text, documents, forms, web browser windows, user options, application interfaces, and instructions for operation, and include the information, such as graphic, text, and sound that a program presents to a user. In addition, UI 122 controls sequences/actions that the user employs to input and/or modify profile information, via file backup program 126, file storage analysis program 200, and/or file storage control program 300. In various embodiments, UI 122 displays one or more icons representing applications that a user can execute via network 110, such as file backup program 126, file storage analysis program 200, file storage control program 300, and various programs (not shown) of system 102 and/or other computing systems accessible via network 110. In addition, UI 122 can control sequences of actions that the user utilizes to respond and/or confirms actions associated with file storage analysis program 200, and/or file storage control program 300.

In some embodiments, a user of device 120 can interact with UI 122 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) can generate UI 122 operating within the GUI environment of device 120. UI 122 accepts input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, UI 122 may receive input in response to a user of device 120 utilizing natural language, such as written words or spoken words, device 120 identifies as information and/or commands.

Device 130 includes UI 132 and various programs and data (not shown). Examples of programs and data that device 130 may include are: an operating system, a web browser; an office productivity suite; a communication program, one or more apps, such as an IM app, a telephone app, and a video chat app; and data, such as storage account information for system 102. In some embodiments, device 130 includes an instance of file backup program 126. In one example, a user of device 130 can monitor a storage account within system 102. In another example, a user of device 130 can utilize UI 132 and/or an instance of file backup program 126 to respond to a notification generated by file storage analysis program 200.

UI 132 includes various functionalities and capabilities described previously with respect to UI 122. In one embodiment, UI 132 is similar to UI 122 of device 120. For example, device 130 is a computing device of another user that shares one or more files stored within system 102 with a user of device 120. In some embodiments, UI 132 is a UI or a GUI of device 130, such as the interface for the applications of a smartphone. In various embodiments, UI 132 is a user interface that is generated by another app or program in response to device 130 receiving a notification from file storage analysis program 200 and/or enabling a user to interface with file storage control program 300. In an example, UI 132 may be a text message pop-up of a telecommunication app that notifies a user of device 130 that one or more files backed up to system 102 may be affected with malware. In another embodiment, file storage control program 300 may utilize device 130 and UI 132 to perform an alternative verification of a malware event within device 120 to prevent message "spoofing" by a malware infection of device 120 to indicate a false positive result from file storage analysis program 200. In some embodiments, UI 132 is generated by an instance of file backup program 126 of device 130.

FIG. 2 is a flowchart depicting operational steps for file storage analysis program 200, a program that analyzes one or more files received (e.g., uploaded) to a storage account as part of a file backup strategy to protect files stored within system 102 from a ransomware attack associated with a computing device, in accordance with embodiments of the present invention. In response to determining that a received file is suspect, such as encryption by ransomware storage analysis program 200 notifies a user to determine whether the analysis of the file is a "false positive" result or that device 120 is affected by malware (e.g., ransomware). In some embodiments, file storage analysis program 200 utilizes multi-factor verification of a malware event to reduce the possibility of a malware attack from reporting (e.g., spoofing) a false positive result in an attempt to disable one or more security measures associated with the present invention. In various embodiments, file storage analysis program 200 processes one or more files shared among users. In an embodiment, one or more instances of file storage analysis program 200 may execute concurrently with one or more instances of file storage control program 300.

In step 202, file storage analysis program 200 receives a file to a storage account. In one embodiment, file storage analysis program 200 receives a file to a storage account associated with a user of device 120, the storage account is included within system 102. In another embodiment, file storage analysis program 200 receives a file to a storage account that is shared with a user of device 120 and another computing device (not shown). In one scenario, file storage analysis program 200 receives a file to a storage account based on file backup program 126 initiating the transfer of the file for backup from device 120 to system 102. In another scenario, file storage analysis program 200 receives a file to a storage account based on file backup program 107 initiating the transfer of the file for backup from device 120 to system 102.

In some embodiments, file storage analysis program 200 receives a group of files for backup. In other embodiments, file storage analysis program 200 receives (e.g., retrieves) one or more shared files from another instance of device 120 that belongs to another user. File storage analysis program 200 utilizes a file backup program 107 and an instance of file backup program 126 corresponding to the other device to retrieve a copy or similar version of a file for analysis (e.g., comparison), discussed in further detail with respect to step 204. In one scenario, file storage analysis program 200 retrieves a file from another instance of device 120 based on initiating a response (discussed in further detail with respect to step 208) generated by another instance of file storage analysis program 200 responding to a file that is suspected of being affected by malware. In one scenario, file storage analysis program 200 retrieves a file from another instance of device 120 based on file storage control program 300 determining that a malware attack is suspected and/or confirmed (e.g., not a false positive result) device 120.

In various embodiments, file storage analysis program 200 buffers or caches (e.g., stores) a file received for backup to prevent a rotation of files versions until the received file is analyzed and verified that the file received for backup is not affected by ransomware while the file received for backup is analyzed. In some scenarios, file storage analysis program 200 buffers or caches a file received for backup in a portion of volatile memory (not shown) within system 102 while the file received for backup is analyzed. In other scenarios, file storage analysis program 200 buffers or caches a file received for backup in file isolation 106 while the file received for backup is analyzed. In a further embodiment, file storage analysis program 200 buffers one or more files and/or versions of files retrieved from storage 103 to file isolation 106 in response to an instance of file storage analysis program 200 receiving a file from device 120 that analyzes as being suspect.

In step 204, file storage analysis program 200 analyzes the received file. In one embodiment, file storage analysis program 200 analyzes the received file to determine whether the received (e.g., uploaded, backed up, etc.) file is affected by malware, and more specifically, whether the received file is encrypted by ransomware. In another embodiment, file storage analysis program 200 analyzes a received file that is buffered within file isolation 106.

In some embodiments, file storage analysis program 200 analyzes file attributes, a file extension, metadata, and/or the structure of the received file to determine whether the received file is affected (e.g., encrypted) by malware, such as ransomware. In one scenario, file storage analysis program 200 analyzes the received file and determines that the structure of the file is a compressed format or an archive file format, such as a .zip format; however, the file extension indicates a different format, such a text or presentation graphics format. In another scenario, file storage analysis program 200 analyzes the received file and determines that the structure of the file is unstructured or is not a delimiter-separated format; however, the file extension is .csv (comma-separated values). In some scenarios, file storage analysis program 200 compares the metadata associated with the received file to a set of properties related to the received file, such as file size. In addition, file storage analysis program 200 may include the file extension within the analysis. In one example, file storage analysis program 200 may determine that a file is suspect based on the file extension indicating that the file is a document file but document properties and/or file metadata indicates that the received file is a different file type.

In various embodiment, file storage analysis program 200 analyzes the received file based on comparing the received version of a file to a currently stored version of the file and/or information associated with each file of a user included within user profiles 104. In one example, file storage analysis program 200 may perform a Diff (e.g., a data comparison tool for calculating data difference and the results thereof) analysis between file versions to determine the extent of the change between the content within two versions of the file. In another example, file storage analysis program 200 may perform an entropy analysis between two versions of the received file. In both examples, the greater the difference the greater the probability the received file is encrypted by ransomware.

Still referring to step 204 in various embodiments, file storage analysis program 200 analyzes the received file based on information associated with each version of the file included within user profiles 104. In an example, file storage analysis program 200 analyzes files stored within system 102 prior to storage utilizing a MD5 algorithm that generates a set of hash values for a file (e.g., a hash value for each portion of a file). File storage analysis program 200 can utilize the stored set of hash values associated with various versions of a file to compare to the set of hash values associated with the received file.

In a further embodiment, file storage analysis program 200 obtains a list of files associated with a user from user profiles 104 to identify other files that a user stored within system 102 that are affected. In one scenario, a ransomware program (not shown) may rename as well as encrypt a set of files of a user. In an example, a user of device 120 backs up three files: note01.txt (file 125A), response.doc (file 125B), and data.csv (file 125C), which correspond to version files 105A, 105B, and 105C. However, a ransomware program renames the three files prior to upload so that note01.txt corresponds to file 125B, response.doc corresponds to file 125C, and data.csv corresponds to file 125A. File storage analysis program 200 may utilize various analyses to determine, based on one or more file properties or data structures within each file, that the malware affected files have a different correspondence: file 125C now corresponds to file 105B, file 125B corresponds to file 105A, and file 125A corresponds to file 105C. Therefore, file storage analysis program 200 determines that each of these three files is suspect based on one or more factors.

Many modifications and variations will be apparent to those of ordinary skill in the art without departing from the scope and spirit of the invention. As is known to one skilled in the art, there are a plurality of methods to determine whether a file has been modified and/or encrypted by a malware attack such as a ransomware program. The current invention utilizes some of these methods within examples of various embodiments of the present invention.

In decision step 205, file storage analysis program 200 determines whether the received file is suspect. In one embodiment, file storage analysis program 200 determines that a received file is suspect based on one or more analyses of the received file by system 102. In another embodiment, file storage analysis program 200 determines that a received file is suspect based a result of one or more analyses performed by another network-accessible computing system (not shown). In some embodiments, file storage analysis program 200 determines that the received file that is shared by one or more users is suspect based on a comparison of the file received from device 120 and a same version or similar version of the file retrieved from another instance of device 120 of a user that shares the file. In other embodiments, storage analysis program 200 determines that one or more other files of a received group of files is suspect in response to file storage analysis program 200 determining that one of the group of files is suspect.

In decision step 205, responsive to determining that the received file is suspect (Yes branch, decision step 205), file storage analysis program 200 notifies a user associated with the file that is suspect (step 206).

In step 206, file storage analysis program 200 file storage analysis program 200 notifies a user associated with the file that is suspect. In one embodiment, file storage analysis program 200 notifies a user of device 120 that the received file is suspect (e.g., is encrypted by ransomware, is infected with malware, etc.) by utilizing UI 122 of device 120. In one scenario, file storage analysis program 200 notifies a user of device 120 via a GUI associated with file backup program 126. In another scenario, file storage analysis program 200 notifies a user that the received file is suspect via a different instance of UI 122, such as a text message via an instant messaging program, an e-mail via an e-mail, and/or a warning pop-up/icon. In another embodiment, file storage analysis program 200 notifies (e.g., warns) each user that shares the received file that the file is suspect.

Still referring to step 206 in some embodiments, file storage analysis program 200 notifies a user via multiple methods and/or multiple computing devices to prevent spoofing of false positive by a malware program. In one scenario, file storage analysis program 200 transmits a notification to both device 120 and device 130. In an example, file storage analysis program 200 transmits the same type of notification to both device 120 and device 130, such as an e-mail message with two web links. A first web link can indicate a false-positive result, and a second web link can confirm a malware attack within device 120. In another scenario, file storage analysis program 200 transmits different information to device 120 and device 130. In one example, file storage analysis program 200 utilizes two-factor identification where device 130 receives a character string for input to a message within UI 122 of device 120 to confirm whether or not device 120 and/or the received file is affected by malware.

In some scenarios, file storage analysis program 200 and/or file storage control program 300 provides a notification reiterating to a user the status of device 120 in either case. In one example, device 130 receives a message from system 102 reiterating the status of device 120. If the status of device 120 does not match the status that the user input, then the user of device 130 may utilize UI 132 to notify file storage control program 300 that device 120 is compromised. In another example, if file storage analysis program 200 does not receive a response from device 120 within a predetermined period of time, then file storage analysis program 200 and/or file storage control program 300 notifies the user again via UI 132 of device 130.

In a further embodiment, as discussed with respect to one user of a file suspected of being affected by malware, if the suspect file is a shared file, then file storage analysis program 200 notifies each user via multiple methods and/or multiple computing devices. By notifying each user of the shared file that is affected by malware, file storage analysis program 200 may enable the users of other instances of device 120 from spreading the malware prior to the malware activating the ransomware aspect and encrypting other files of the other users.

In step 208, file storage analysis program 200 initiates a set of responses. In one embodiment, file storage analysis program 200 initiates one or more responses of a set of responses prior receiving input from a user of confirming whether device 120 is affected (e.g., attacked) by malware or not a device 120 is not affected by malware. Examples of responses include isolating the received file, suspending the version control rotation of the suspect file, setting a timeout duration for a response, and transmitting a copy of the suspect file to another computing system (not shown) for analysis. In another embodiment, file storage analysis program 200 initiates one or more other responses of the set of response that affect other files of the user the uploaded the suspect file. Other responses may include suspending file rotation for other files of the user identified within user profiles 104 for the user and within some computing environments, such as an enterprise computing system, notifying the administrator of the enterprise that the user has at least one file suspected of being affected by malware.

In some embodiments, file storage analysis program 200 initiates a set of responses with respect to one or more other users that share a file that is suspect. In one example, file storage analysis program 200 blocks one or more other users that share a file that is suspect from downloading or restoring another shared file stored within system 102 until the other file is scanned and verified not to be infected with malware. In another example, file storage analysis program 200 suspends file version rotation for another file that is shared with the user of the suspect file. In another example, file storage analysis program 200 retrieves a copy of the other shared file from one of the other user. File storage program 200 may utilize the retrieved file to compare, such as via a cryptographic has function to another version of the other shared file within storage 103 to determine whether the version of the other shared file within storage 103 is also suspect.

Still referring to step 208 in a further embodiment, file storage analysis program 200 initiates other responses, such as isolating one or more other files associated with the user and analyzes the one or more recent files. In one scenario, if system 102 includes an anti-malware program, then file storage analysis program 200 may scan the one or more other files of a user, such as the most recent version, to determine whether any of the one or more other files associated with the user are infected with malware that is dormant at this point in time and respond based on the determination. In an example, file storage analysis program 200 determines that other files associated with the user are infected with malware and in response, file storage analysis program 200 utilizes communication program 108 to notify the user which other files are infected with malware. In addition, file storage analysis program 200 can stop file backup program 107 from preforming one or more file restores to device 120 to prevent re-infecting device 120 with malware.

In another scenario, if system 102 does not includes an anti-malware program, then file storage analysis program 200 can transmit a copy of the one or more other files associated with a user to another network-accessible computing system (not shown), to determine whether any of the one or more other files associated with the user are infected with malware that is dormant at this point in time and respond based on the determination. In some scenarios, file storage analysis program 200 utilizes network 110 to initiate one or more responses within device 120, such as modifying the actions of file backup program 126, activating an on-device anti-malware program, linking device 120 to a network accessible anti-malware program, setting a flag for device 120 to operate in "safe mode" at the next power-on, etc.

Referring to decision step 205, responsive to determining that the received file is not suspect (No branch, decision step 205), file storage analysis program 200 stores the file (step 209).

In step 209, file storage analysis program 200 stores the file. In addition, file storage analysis program 200 migrates, moves, and/or deletes a copy of the received file from a storage buffer/cache or file isolation 106. In one embodiment, file storage analysis program 200 interfaces with backup program 107 to store the received file. In one scenario, in response to a storage account of a user not utilizing version control, the received file replaces a file backed up within storage 103. In another scenario, in response to a storage account of a user utilizing version control, the file received by storage analysis program 200 is placed within a file rotation scheme within storage 103.

In another embodiment, storage analysis program 200 stores the received file. In some embodiments, storage analysis program 200 also notifies other users of a shared file that is received that storage analysis program 200 stored another version of the file to storage 103. In one example, storage analysis program 200 utilizes communication program 108 and/or file backup program 107 to interface with UI 122 to notify other users of a shared file that another version of the file is stored within system 102. In another example, storage analysis program 200 utilizes file backup program 107 to interface with file backup program 126 and updates a list of files storage within system 102. The list of stored files and corresponding version information may be updated within instances of user profile 124 of corresponding instances of device 120 of other users that share the file.

Figure 3:
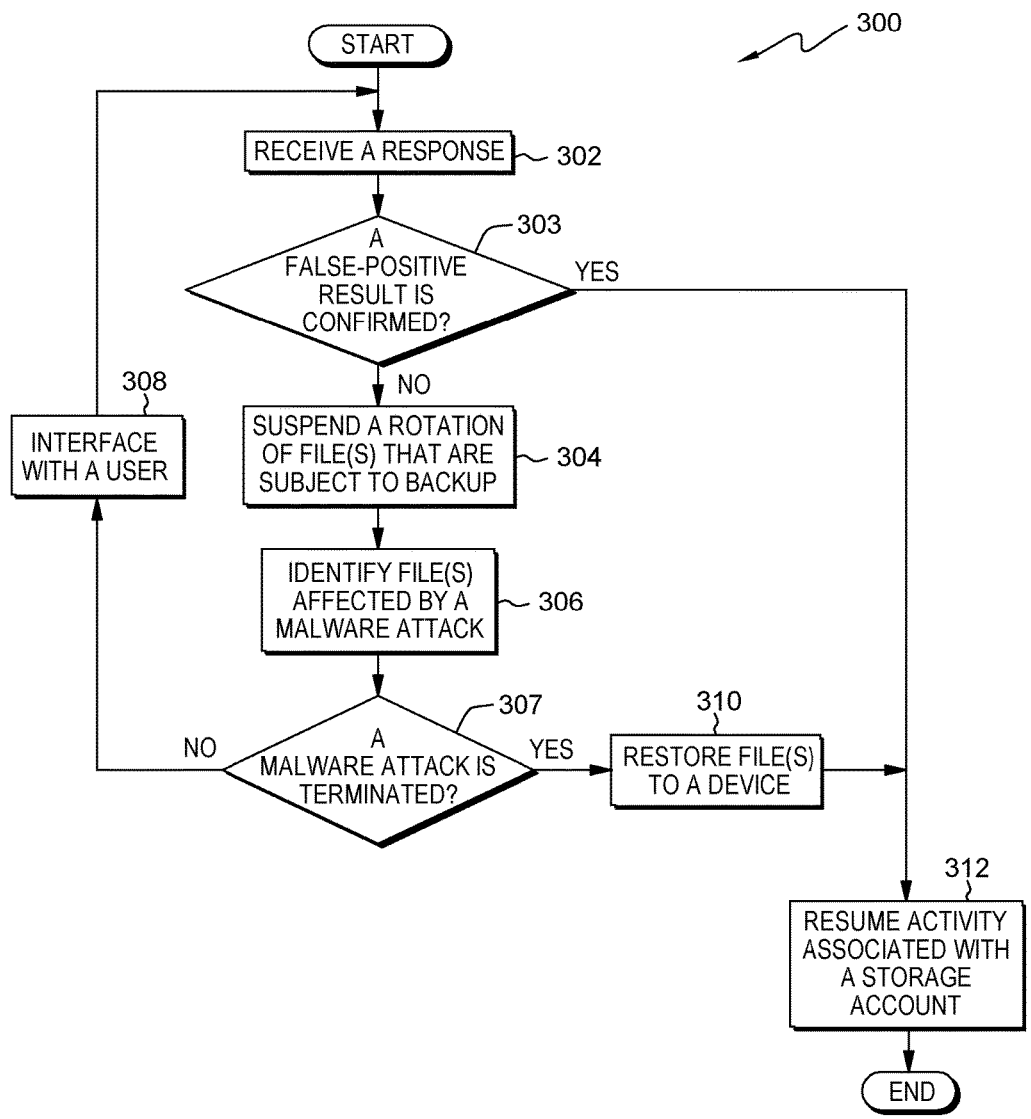
FIG. 3 depicts a flowchart of the operational steps of a file storage control program, in accordance with an embodiment of the present invention.

FIG. 3 is a flowchart depicting operational steps for file storage control program 300, a program for confirming whether analyses performed by file storage analysis program 200 to a file for backup is a false-positive result, in accordance with embodiments of the present invention. In one embodiment, if a false-positive result of a file for backup is not confirmed, then file storage control program 300 initiates various responses based on treating device 120 as infected by malware. In another embodiment, file storage control program 300 identifies other files associate with a user and/or shared among one or more other users affected by a malware attack. In various embodiments, in response to the termination of a malware attack within a device of a user, file storage control program 300 restores one or more files associated with the user to the device of the user. Subsequently, file storage control program 300 resumes one or more activities associated with a storage account of the user.

In step 302, file storage control program 300 receives a response. In addition, file storage control program 300 may receive additional information that affects a response, such as file storage analysis program 200 dictating that multi-device confirmation is utilized to confirm a false-positive result for a suspect file, or a timeout duration is dictated for a response. In one embodiment, file storage control program 300 receives a response from a user of device 120 in response to a notification of a suspect file from file storage analysis program 200. In one scenario, file storage control program 300 receives a response for a user of device 120. In another scenario, file storage control program 300 receives a response from another device and/or an additional device associated with a user of a suspect file, such as device 130 via communications program 108. In an example, file storage control program 300 determines that a user has authority to indicate a malware attack. However, file storage control program 300 dictates that another device (e.g., device 130) and/or information from the other device is required to confirm a false-positive result for a suspect file. In another embodiment, file storage control program 300 receives a response from another program, such as an anti-malware program.

In some embodiments, file storage control program 300 receives a response from another user. In one scenario, file storage control program 300 receives a response from another user that shares a suspect file with the user of device 120. In another scenario, file storage control program 300 receives a response from an administrator of a portion of networked computing environment 100. In an example, file storage control program 300 determines that a user has authority to indicate a malware attack but confirming a false-positive result is limited to another program or an administrator of a portion of networked computing environment 100. In other embodiments, file storage control program 300 receives an internally generated response based on file storage analysis program 200 setting a timeout duration for a response (previously discussed with respect to FIG. 2, Step 208). In one scenario, if file storage control program 300 determines, based on information within user profiles 104, that a suspect file is identified as non-critical, then file storage control program 300 responds to an expiration of a timeout duration as a false-positive result. In another scenario, if file storage control program 300 determines, based on information within user profiles 104, that a suspect file is identified as critical, then file storage control program 300 responds to an expiration of a timeout duration as if device 120 is subject to a malware attack (e.g., a false-positive is not confirmed).

In decision step 303, file storage control program 300 determines whether a false-positive result is confirmed. In one embodiment, file storage control program 300 determines that a false-positive result for a suspected file is confirmed based on input from: a user via a user of device 120; a multi-factor verification scheme utilizing device 130, an administrator of a portion of networked computing environment 100, and/or an expiration of a timeout duration.

In another embodiment, file storage control program 300 determines that a false-positive result is not confirmed. In one scenario, file storage control program 300 determines that a false-positive result is not confirmed based on a user indicating that device 120 is affected by malware, such as the suspect file identified by file storage analysis program is encrypted by ransomware. In another scenario, file storage control program 300 determines that a false-positive result is not confirmed based on receiving a response from an anti-malware program (not shown) that device 120 is affected by malware. In some embodiments, file storage control program 300 determines that a false-positive result is not confirmed based on information within user profiles 104 and an expiration of a timeout duration. In other embodiments, file storage control program 300 determines that a false-positive result is not confirmed based one or more responses from users of other instances of device 120 that share the suspect file associated with the user of device 120.

In decision step 303, responsive to determining that a false-positive result is not confirmed (No branch, decision step 303), file storage control program 300 suspends a rotation of file(s) that are subject to backup (step 304).

In step 304, file storage control program 300 suspends a rotation of file(s) that are subject to backup. In one embodiment, file storage control program 300 suspends a rotation (e.g., version control additions/deletions) of the suspect file received for backup. In another embodiment, file storage control program 300 suspends (e.g., locks out) a rotation of a set files that are subject to backup that are associated with the user of device 120. In one example, file storage control program 300 suspends a rotation of all files for backup that are identified within a list of files associated with the user of device 120, such as within a profile of the user included in user profiles 104. In another example, file storage control program 300 suspends a rotation of files for backup that are associated with device 120; however, files subject to backup for a different instance of device 120 are not affected. In some embodiments, file storage control program 300 suspends a rotation of a set files that are subject to backup that are shared by a user of device 120 with one or more other users.

In step 306, file storage control program 300 identifies file(s) affected by a malware attack. Files affected by a malware attack include files that are encrypted by ransomware and/or file infected with malware that is currently dormant (e.g., not executing). In one embodiment, file storage control program 300 identifies one or more files affected by a malware attack related to device 120 by utilizing various analysis techniques employed by file control analysis program 200, such as to identify file encrypted by ransomware. In one scenario, file storage control program 300 analyzes other files of a user within storage 103 to identify files affected by malware. In another scenario, file storage control program 300 executes file backup program 107 to upload one or more other files of device 120 to file isolation 106 for analyses and identification of one or more files affected by a malware attack.

In another embodiment, file storage control program 300 utilizes an anti-malware program (not show) included within system 102 and/or accessible via network 110 to identify whether one or more files are affected by a malware attack and/or are infected with dormant malware. In one scenario, file storage control program 300 utilizes an anti-malware program to analyze other files of a user within storage 103 to identify files affected by malware. In another scenario, file storage control program 300 executes file backup program 107 to upload one or more other files of device 120 to file isolation 106 and utilizes an anti-malware program to analyze and identifies of one or more files affected by a malware attack.

In various embodiments, file storage control program 300 analyzes files of one or more users that share a file affected by malware. Similarly, file storage control program 300 analyzes files within storage 103 and/or another instance of device 120 associated with the shared file affected by malware. In a further embodiment, if an anti-malware program utilized by file storage control program 300 cannot identify other files affected by malware, then file storage control program 300 may utilize one or more recursive comparison techniques to identify files potentially affected by malware. In one scenario, file storage control program 300 may compare different unencrypted files to determine whether the different files include common elements that may not be included in each version of a file. In an example, file storage control program 300 compares different document file of file extension ".docx" and identifies embedded macros and/or script code. In a subsequent comparison among different versions of the same file, file storage control program 300 determines that the embedded macros and/or script code is not included in each version of the file, such as an embedded macro is included within files 125E thru 125H but does not exist within file 125A thru 125D.

In decision step 307, file storage control program 300 determines whether a malware attack is terminated. In one embodiment, file storage control program 300 determines that a malware attack within device 120 is terminated based on receiving a response from the user of device 120, such as via device 120 and/or device 130. In another embodiment, file storage control program 300 determines that a malware attack within device 120 is terminated based on receiving a response an anti-malware program (not shown). In one scenario, file storage control program 300 determines that a malware attack within device 120 is terminated based on receiving a response an anti-malware program of device 120. In another scenario, file storage control program 300 determines that a malware attack within device 120 is terminated based on receiving a response an anti-malware program that scans device 120 via network 110. In various embodiments, file storage control program 300 determines that a malware attack within device 120 is terminated based on receiving a response an administrator of a portion of networked computing environment 100 that is responsible for device 120, such as a corporate cybersecurity department.

In decision step 307, responsive to determining that a malware attack is not terminated (e.g., is still active) (No branch, decision step 307), file storage control program 300 interfaces with a user (step 308).

In step 308, file storage control program 300 interfaces with a user. In one embodiment, file storage control program 300 interfaces with a user by communicating a status (e.g., information) of one or more files associated with the user of device 120. File storage control program 300 may utilize device 120 and/or device 130 to interface with the user. In an example, file storage control program 300 may identify: the files of the user encrypted by ransomware including the versions of each file that are also encrypted, the files of a user infected with malware, and the files of the user that are not affected by malware. In another embodiment, file storage control program 300 interfaces with one or more other users that share one or more files associated with the user of device 120 to advise the one or more other users that one or more shared files and/or device 120 are affected by malware. In a further embodiment, file storage control program 300 also communicates a status (e.g., information) of one or more files associated with each of the other users that shares an affected file associated with the user of device 120.

In some embodiments, file storage control program 300 interfaces with an administrator and/or cybersecurity group associated with a portion of networked computing environment 100 related to device 120 and system 102. File storage control program 300 may identify a status of each file correspond version of a file associated with the one or more users affected by a malware attack.

Referring to decision step 307, responsive to determining that a malware attack is terminated (Yes branch, decision step 307), file storage control program 300 restores file(s) to a device (Step 310).

In step 310, file storage control program 300 restores file(s) to a device. In one embodiment, file storage control program 300 restores one or more files to the user of device 120. Based on determining which files of device 120 are encrypted by ransomware, file storage control program 300 restores an unaffected version of the one or more files from storage 103 to device 120. In another embodiment, file storage control program 300 restores one or more files from storage 103 to device 120 based on receiving a selection of files from a user. In various embodiments, file storage control program 300 prevents a user from restoring one or more files from storage 103 to a device of the user until the stored one or more files are scanned for malware, and identified as safe to use. In addition, file storage control program 300 may maintain one or more files within isolation 106 that are infected with malware until an anti-malware program (not shown) can disinfect the infected files. File storage control program 300 may restore a disinfected file to a related instance of device 120 and/or to storage 103.

In some embodiments, file storage control program 300 restores one or more files to the user that shared one or more files affected by malware. File storage control program 300 may delay restoring one or more files to a user that shared a file affected with malware until the corresponding instance of device 120 for the user is determined to be free of a malware infection. Subsequently, file storage control program 300 resumes activity associated with a storage account (discussed in further detail with respect to step 312).

Referring to decision step 303, responsive to determining that a false positive is confirmed (Yes branch, decision step 303), file storage control program 300 resumes activity associated with a storage account (step 312).

In step 312, file storage control program 300 resumes activity associated with a storage account. In one embodiment, file storage control program 300 resumes activity associated with a storage account by re-enabling file rotation associated with files backed up utilizing version control. In another embodiment, resumes activity associated with a storage account by allowing file sharing. In some embodiments, in response to file storage control program 300 resuming activity associated with a storage account, file storage control program 300 deletes malware affected files from file isolation 106. In other embodiments, file storage control program 300 retains one or more ransomware affected files within file isolation 106 for possible decryption by a cybersecurity department associated with a portion of networked computing environment 100.

Figure 4:
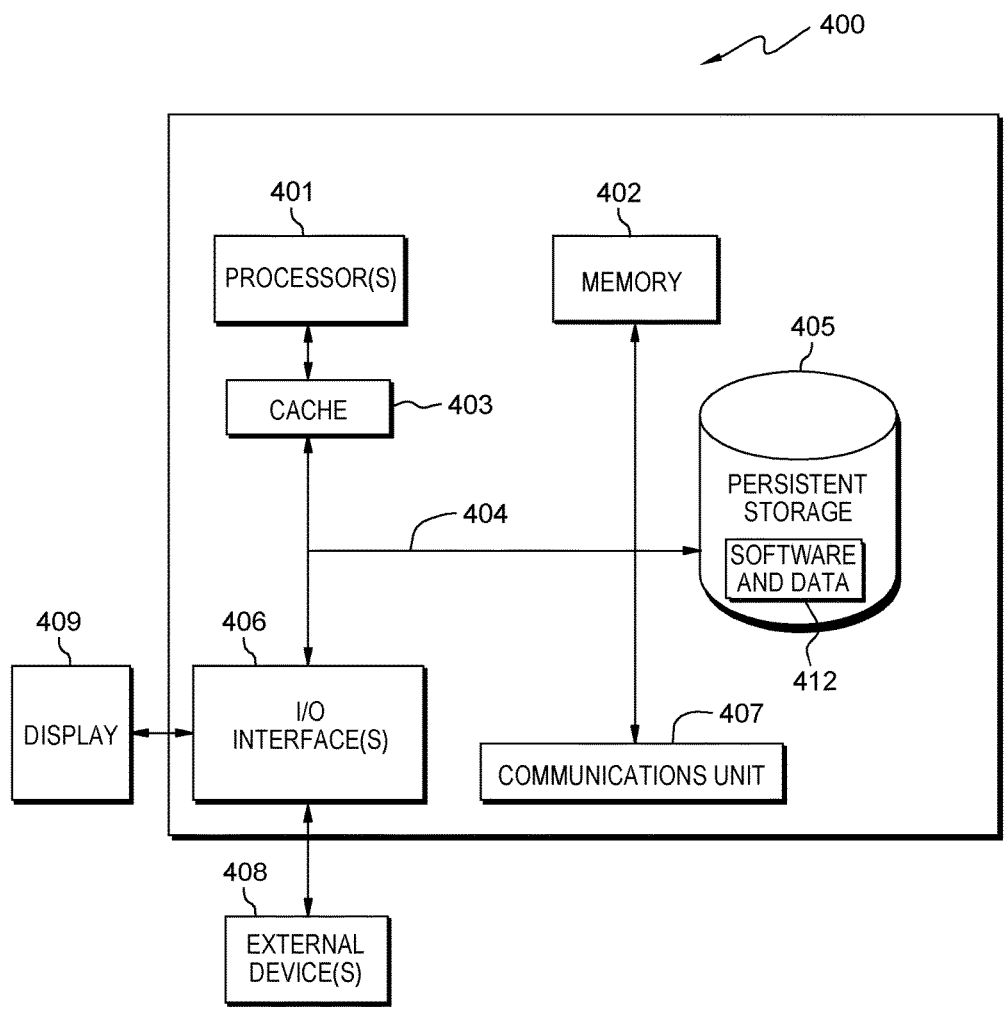
FIG. 4 is a block diagram of components of a computer, in accordance with an embodiment of the present invention.

FIG. 4 depicts a block diagram of computer system 400, which is representative of system 102, device 120, and device 130. Computer system 400 is an example of a system that includes software and data 412. Computer system 400 includes processor(s) 401, memory 402, cache 403, persistent storage 405, communications unit 407, input/output (I/O) interface(s) 406, and communications fabric 404. Communications fabric 404 provides communications between memory 402, cache 403, persistent storage 405, communications unit 407, and I/O interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. In an embodiment, with respect to system 102, storage 103 and file isolation 106 are included in persistent storage 405. In some embodiments, a portion of file isolation 106 is included within memory 402.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to system 102, software and data 412 includes: user profiles 104, files 105A thru 105N, file backup program 107, communication program 108, file storage analysis program 200, file storage control program 300, and various programs (not shown). In addition, a portion of persistent storage 405 may be allocated for file isolation 106. With respect to device 120, software and data 412 includes UI 122, user profiles 124, files 125A thru 125N, and file backup program 126. With respect to device 130, software and data 412 includes: UI 132 and various programs and data (not shown).

Communications unit 407, in these examples, provides for communications with other data processing systems or devices, including resources of system 102, device 120, and device 130. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/Oterface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives, such as "at least one of A, B, and C" should be interpreted to mean "at least one A, at least one B, at least one C, or any combination of A, B, and C."

Additionally, the phrase "based on" should be interpreted to mean "based, at least in part, on."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for safeguarding a stored file from malware, the computer program product comprising:

one or more computer readable storage media and program instructions stored on the one or more computer readable storage media, the program instructions readable/executable by one or more computer processors and further comprising:

program instructions to receive, to a storage system, a first file from a first computing device, wherein the first computing device is associated with a first user;

program instructions to analyze the received first file to determine whether the received first file is suspected of encryption by malware;

program instructions to respond to determining that the received first file is suspected of encryption by malware by initiating one or more actions, including:
  (i) suspending replacement of an instance of the first file backed up to the storage system with the received first file;
  (ii) determining, based a profile associated with the first user, to interface with the first user utilizing two or more computing devices associated with the first user, wherein the first computing device includes the first file that is not stored on the second computing device; and
  (iii) transmitting a notification, to the first user associated with the received first file, to the two or more computing devices associated with the first user, wherein transmitting the notification to the two or more computing devices associated with the first user includes transmitting the notification to the second computing device, wherein the notification includes a result of analysis of the received first file; and
program instructions to store the received first file to a portion of the storage system designated for file isolation.

2. The computer program product of claim 1, further comprising:
program instructions to determine that the storage system utilizes one or more security measures, wherein a first security measure dictates that a confirmation of a false-positive result by a user is received from a computing device, identified within a profile associated with the user, different from computing devices that store a version of a file that is suspected of encryption by malware; and
program instructions to receive, from a computing device associated with the first user, a response from the first user associated with the received first file, indicating whether the analysis of the received first file is a false-positive result for encryption by malware.

3. The computer program product of claim 1, wherein the program instructions to analyze the received first file to determine whether the received first file is suspected of encryption by malware further comprise:
program instructions to determine one or more attributes associated with the received first file;
program instructions to compare the one or more attributes of the received first file to one or more corresponding items related to the received first file, wherein the items related to the received first file are selected from the group consisting of a structure of the received first file, a portion of content of the received first file, one or more file attributes of other versions of the first file, a structure of another version of the first file, and a portion of content of another version of the first file; and
program instructions to respond to the comparison of the one or more attributes associated with the received first file and the one or more corresponding items related to the received first file identifying one or more differences by indicating that the received first file is suspected of encryption by malware.

4. The computer program product of claim 1, further comprising:
program instructions to determine that the storage system supports version control of files backed up to the storage system; and
program instructions to respond to determining that the storage system supports version control of files backed up to the storage system by suspending file rotation of versions of the first file backed up to the storage system.

5. The computer program product of claim 2, further comprising:
program instructions to respond to receiving the response from the computing device associated with the first user that indicates that the analysis of the received first file is not a false-positive result by identifying a profile associated with the user of the received first file;
program instructions to determine a listing of files backed up to the storage system corresponding to the first user and the first computing device, including the received first file; and
program instructions to suspend rotation of files of the determined listing of files backed up to the storage system.

6. The computer program product of claim 2, further comprising:
program instructions to respond to receiving the response from the computing device associated with the first user that indicates that the analysis of the received first is a false-positive result by determining whether the response indicating the false-positive result is received from the second computing device associated with the first user;
program instructions to respond to determining that the response indicating the false-positive result is received from the second computing device associated with the first user by determine a listing of files backed up to the storage system corresponding to the first user and the first computing device, including the received first file;
program instructions to resume rotation of files of the determined listing of files backed up to the storage system; and
program instructions to store the received first file to the storage system based, at least in part, on a rotations of files and the user profile of the first user, wherein the received first files is removed from file isolation in response to determining that a false-positive result is confirmed.

7. A computer system for safeguarding a stored file from malware, the computer system comprising:
one or more computer processors;
one or more computer readable storage media;
program instructions stored on the computer readable storage media for reading/execution by at least one of the one or more computer processors, the program instructions further comprising:
  program instructions to receive, to a storage system, a first file from a first computing device, wherein the first computing device is associated with a first user;
  program instructions to analyze the received first file to determine whether the received first file is suspected of encryption by malware;
  program instructions to respond to determining that the received first file is suspected of encryption by malware by initiating one or more actions, including:
    (i) suspending replacement of an instance of the first file backed up to the storage system with the received first file;
    (ii) determining, based a profile associated with the first user, to interface with the first user utilizing two or more computing devices associated with the first user, wherein the first computing device includes the first file that is not stored on the second computing device; and (iii) transmitting a notification, to the first user associated with the received first file, to the two or more computing devices associated with the first user, wherein transmitting the notification to the two or more computing devices associated with the first user includes transmitting the notification to the second computing device, wherein the notification includes a result of analysis of the received first file; and program instructions to store the received first file to a portion of the storage system designated for file isolation.

8. The computer system of claim 7, further comprising:
program instructions to determine that the storage system utilizes one or more security measures, wherein a first security measure dictates that a confirmation of a false-positive result by a user is received from a computing device, identified within a profile associated with the user, different from computing devices that store a version of a file that is suspected of encryption by malware; and program instructions to receive, from a computing device associated with the first user, a response from the first user associated with the received first file, indicating whether the analysis of the received first file is a false-positive result for encryption by malware.

9. The computer system of claim 8, further comprising:
program instructions to respond to receiving the response from the computing device associated with the first user that indicates that the analysis of the received first file is not a false-positive result by identifying a profile associated with the user of the received first file;

program instructions to determine a listing of files backed up to the storage system corresponding to the first user and the first computing device, including the received first file; and program instructions to suspend rotation of files of the determined listing of files backed up to the storage system.

10. The computer system of claim 8, further comprising:
program instructions to respond to receiving the response from the computing device associated with the first user that indicates that the analysis of the received first is a false-positive result by determining whether the response indicating the false-positive result is received from the second computing device associated with the first user;

program instructions to respond to determining that the response indicating the false-positive result is received from the second computing device associated with the first user by determine a listing of files backed up to the storage system corresponding to the first user and the first computing device, including the received first file;

program instructions to resume rotation of files of the determined listing of files backed up to the storage system; and program instructions to store the received first file to the storage system based, at least in part, on a rotations of files and the user profile of the first user, wherein the received first files is removed from file isolation in response to determining that a false-positive result is confirmed.

11. The computer system of claim 7, wherein the program instructions to analyze the received first file to determine whether the received first file is suspected of encryption by malware further comprise:

program instructions to determine one or more attributes associated with the received first file;

program instructions to compare the one or more attributes of the received first file to one or more corresponding items related to the received first file, wherein the items related to the received first file are selected from the group consisting of a structure of the received first file, a portion of content of the received first file, one or more file attributes of other versions of the first file, a structure of another version of the first file, and a portion of content of another version of the first file; and program instructions to respond to comparison of the one or more attributes associated with the received first file and the one or more corresponding items related to the received first file identifying one or more differences by indicating that the received first file is suspected of encryption by malware.

12. The computer system of claim 7, further comprising:
program instructions to determine that the storage system supports version control of files backed up to the storage system; and program instructions to respond to determining the storage system supports version control of files backed up to the storage system by suspending file rotation of versions of the first file backed up to the storage system.

13. The computer program product of claim 1, further comprising:
program instructions to determine that the storage system supports user profiles for backing up files to the storage system, a user profile including:
a list of files that a user backed up to the storage system, the list of files further including:
identities of one or more computing devices respectively associated with files of the list of files;
an indication that identifies whether a file included in the list of files, backed up to the storage system, is shared; and
one or more computing devices associated with the user, wherein the one or more computing devices of the user include the first computing device.

14. The computer system of claim 7, further comprising:
program instructions to determine that the storage system supports user profiles for backing up files to the storage system, a user profile including:
a list of files that a user backed up to the storage system, the list of files further including:
identities of one or more computing devices respectively associated with files of the list of files;
an indication that identifies whether a file included in the list of files, backed up to the storage system, is shared; and
one or more computing devices associated with the user, wherein the one or more computing devices of the user include the first computing device.

\* \* \* \* \*